UNITED STATES PATENT OFFICE 2,515,233

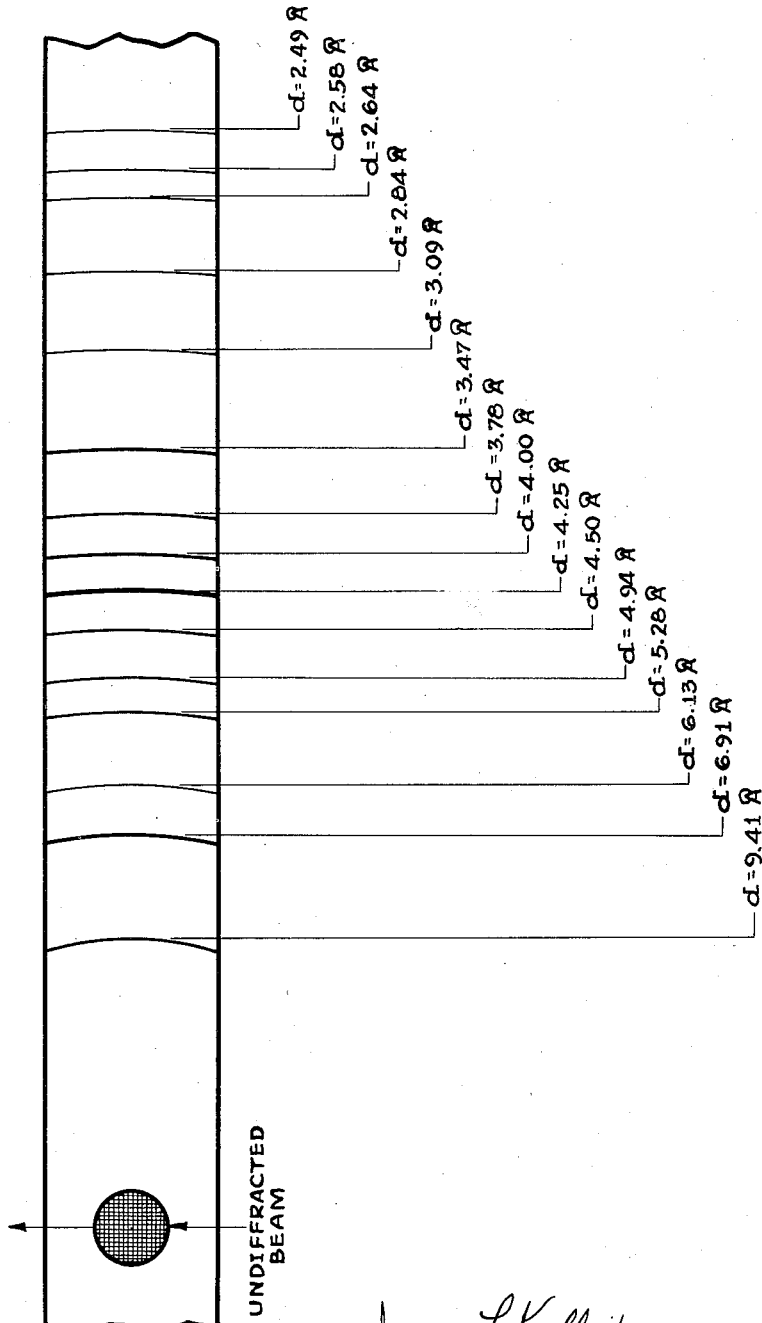

PROCESSES FOR PRODUCING A 4-PICOLINE-SULFUR CONDENSATION PRODUCT

James L. Keller, South Charleston, W. Va., assignor, by mesne assignments, to Koppers Company, Incorporated, Pittsburgh, Pa., a corporation of Delaware Application May 19, 1944, Serial No. 536,280

5 Claims. (Cl. 260—290)

The present invention relates to condensation products of pyridine homologues and more particularly to a condensation product of 4-picoline and sulphur.

It is known to sulphurate mixtures of tar bases obtained from tar distilleries, for example, mixtures of pyridine and quinoline and their respective homologues. The so-obtained sulphurate mixtures of black pitch-like products have been utilized in the past without separation of individual constituents. More recently it was found that all of the constituents of said tar bases do not react with sulphur-containing compounds, such as sulphur or sulphur halides. For example, 3-picoline can be separated substantially unchanged when a close-boiling tar base mixture, comprising 3- and 4-picolines and 2,6-lutidine, is treated with sulphur or sulphur halides to condense the 4-picoline and the 2,6-lutidine as a black insoluble mass.

An object of the present invention is to provide a novel composition of matter, a condensation product of 4-picoline and sulphur.

A further object of the invention is to provide an improved process for obtaining high yields of a condensation product of 4-picoline and sulphur.

The invention has for further objects such other improvements and such other advantages or results as may be found to obtain in the processes and product hereinafter described and claimed.

According to the present invention when relatively pure 4-picoline is reacted with a sulphur-containing compound, for example, with sulphur by refluxing the said constituents in a still, hydrogen sulphide is evolved with formation of the product of invention. The presence of a trace of sodium hydroxide in the reaction mixture gives improved yields. After reaction, the product can be dissolved in acid, such as hydrochloric acid, and the so-produced solution separated from acid-insoluble material. The residue is largely unreacted sulphur. On neutralization of the acid solution with a base, such as sodium hydroxide, the new product is again precipitated as a brown mass. Upon decolorization and recrystallization, for example, from methyl alcohol solution there is produced a pure, cream-colored crystalline product having a melting point of 251.8° C. to 252.6° C., a constant proportion of carbon, hydrogen, nitrogen and sulphur and exhibiting a definite X-ray diffraction pattern. The said product is very soluble in methyl, ethyl and isopropyl alcohols, chloroform, and acetic acid. It is less soluble in benzene, toluene and dioxane, and still less soluble in acetone, carbon tetrachloride, cyclohexane and petroleum ether and least soluble in water.

A study of the reaction with varying ratios of 4-picoline and sulphur indicated that a ratio respectively of 4:7 to 4:8 will give the best yields. The reaction involved appears to be as follows:

$$4 N.C_6H_4.CH_3 + 7S = 6H_2S + C_{24}H_{16}N_4S$$

and the probable reaction product is tetra-(4-pyridyl-thiophene, having the following structure:

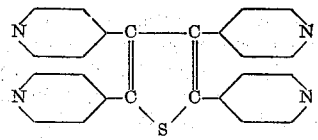

In addition to the hereinabove described characteristics of the new product, it may be further characterized by its X-ray diffraction pattern, a method for crystalline product identification well recognized in the analytical field. The usual Debye-Scherrer-Hull method of X-ray analysis was employed with a powder sample of the product using nickel filtered copper radiation having an effective wave length of 1.539 Ångstroms. The effective diameter of the cylindrical camera employed was 171.9 millimetres. The procedure employed and interpretation of results is described by Hanawalt, Rinn and Frevel, Industrial and Engineering Chemistry, Analytical edition, volume 10, page 457 (1938).

In the accompanying drawing forming a part of this specification the single figure is a diagrammatic representation of the film produced on exposing the product sample to said X-rays. The interplaner spacings corresponding to the diffraction lines are represented by the so-called "d" values in said figure and are given in Ångstrom units. The relative intensities of said diffraction lines are indicated in said figure by shading.

The novel product of invention can be useful in a number of different fields, for example, as intermediates in the preparation of other chemical compounds, such as pharmaceuticals as an antimalarial, as valuable ingredients in pest control, as inhibitors where metals are treated with acids and as chemicals useful in the vulcanization of rubber.

The following example illustrates methods for producing the product of invention.

In flasks fitted with reflux condensers and heated by external baths, there were heated and refluxed mixtures of 4.66 grams of 4-picoline, .01 gram sodium hydroxide and varying amounts of flowers of sulphur ranging from 2.4 grams to 4.0 grams. These quantities represented 4-picoline to sulphur molar ratios of from 4:6 to 4:10 respectively. The contents of the flask in each instance were heated for about 2.5 to 3 hours under total reflux, the heating bath temperature being gradually increased from about 160° C. to about 300° C. Hydrogen sulphide was evolved and measured and after the reflux period 25 c. c. of 6N-hydrochloric acid solution were added to each flask, the contents refluxed to dissolve the reaction product and to drive off residual hydrogen sulphide. The resulting brown solution was cooled and filtered to separate acid-insoluble material comprising largely unreacted sulphur. To the filtrate there was slowly added 2N-sodium hydroxide solution, until the acid was neutralized and then a slight excess of sodium hydroxide was added.

This operation precipitated a brown solid, the product of invention. In the following table is given the results obtained with varying reactant ratios.

| 4-Picoline to Sulphur Molar Ratio | Reaction Product Obtained, in Grams | Yield Per Cent of Theory |
|---|---|---|
| 4:6 | 3.73 | 76.0 |
| 4:7 | 4.12 | 83.8 |
| 4:8 | 4.42 | 89.9 |
| 4:10 | 3.83 | 77.8 |

The above-given results indicate that a molar ratio of four parts 4-picoline to between seven and eight parts sulphur give the best yields. In a further test conducted as hereinabove described with a 4:7 ratio respectively of 4-picoline and sulphur but without using any sodium hydroxide as a so-called catalytic agent, the yield of reaction product was only 68 percent of theory. Portions of the brown reaction product obtained in the above-given condensations were decolorized with carbon and repeatedly crystallized from methyl alcohol solution, yielding cream-colored crystals having a melting point of 251.8° C. to 252.6° C. The refined product was analyzed and its molecular weight determined. These results coupled with the measured quantities of hydrogen sulphide evolved, indicate that 4.66 grams 4-picoline+2.80 grams sulphur yielded 2.55 grams $H_2S$+4.9 grams $C_{24}H_{16}N_4S$. The probable structural equation can be written as follows, the produce of invention being designated as tetra-(4-pyridyl) thiophene.

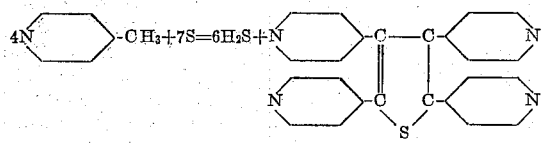

The said product structure represents a condensation of four molecules of 4-picoline and one molecule of sulphur.

A comparison of analytical values found and the theoretical values based on said structure are as follows:

|  |  | Theory | Found |
|---|---|---|---|
| Carbon | per cent | 73.44 | 73.6 |
| Hydrogen | do | 4.11 | 4.0 |
| Nitrogen | do | 14.28 | 14.2 |
| Sulphur | do | 8.17 | 8.4 |
| Molecular Weight |  | 393 | 401 |

Relatively pure 4-picoline is preferred as reactant for reasons of ease of recovery of the pure product, although the latter can be recovered from close-boiling tar base mixtures obtained from a tar distillery and comprising 3- and 4-picolines and 2,6-lutidine. On treating such a tar base mixture with sulphur as hereinabove described, the 3-picoline does not react. The 4-picoline-sulphur condensation product can be separated by fractional crystallization with methyl alcohol from the 2,6-lutidine-sulphur condensation product, the latter crude product melting from 68° C. to 108° C.

The invention as hereinabove set forth is embodied in particular form and manner but may be variously embodied within the scope of the claims hereinafter made.

I claim:

1. A process for producing a novel condensation product of 4-picoline and sulphur, comprising: refluxing a mixture of 4-picoline and sulphur in the presence of a catalyst; dissolving the so-obtained crude product in acid and separating so-produced acid solution from acid-insoluble material; neutralizing said acid solution and thereby precipitating a purified crystalline product; to produce a pyridyl thiophene having a melting point of about 252° C. and a cream-colored crystal.

2. A process for producing a novel condensation product of 4-picoline and sulphur, comprising: reacting 4-picoline and sulphur in a molar ratio respectively of from 4:7 to 4:8 in the presence of less than about 1% by weight of sodium hydroxide; dissolving the crude product in acid and separating so-produced acid solution from acid-insoluble material; neutralizing said acid solution and thereby precipitating a purified crystalline product; and thereafter recrystallizing said product from a suitable solvent; to produce a pyridyl thiophene having a melting point of about 252° C. and a cream-colored crystal.

3. A process for producing a new condensation product, comprising: heating a mixture of relatively pure 4-picoline, sulphur and less than .5% by weight of sodium hydroxide at a temperature of about 300° C. for about three hours; dissolving the so-obtained crude product in hydrochloric acid solution and separating the acid-insoluble material from acid solution; neutralizing said acid solution with sodium hydroxide solution and reprecipitating crystalline product; and thereafter recrystallizing said crystalline product from methyl alcohol; to produce a pyridyl thiophene having a melting point of about 252° C. and a cream-colored crystal.

4. A process for producing a novel condensation product of 4-picoline and sulphur from a mixture of tar bases comprising 3-picoline, 4-picoline and 2,6-lutidine, said process comprising: refluxing a mixture of said tar bases and sulphur; separating unreacted 3-picoline from the crude reaction product; dissolving said crude reaction product in acid and separating so-produced acid solution from acid-insoluble material; neutralizing said acid solution and thereby precipitating a mixture of condensation product of 4-picoline and sulphur and 2,6-lutidine and sulphur; and separating from said mixture said 4-picoline-sulphur product by fractional crystallization with methyl alcohol; to produce a tetra (4-pyridyl) thiophene having a melting point of about 252° C. and a cream-colored crystal.

5. As a new composition of matter a condensation product of 4-picoline and sulphur made by the process defined in claim 3.

JAMES L. KELLER.

REFERENCES CITED

The following references are of record in the file of this patent:

UNITED STATES PATENTS

| Number | Name | Date |
|---|---|---|
| 1,722,026 | Weiland | July 23, 1929 |
| 2,272,159 | Cislak | Feb. 3, 1942 |

Certificate of Correction

Patent No. 2,515,233                                July 18, 1950

JAMES L. KELLER

It is hereby certified that error appears in the printed specification of the above numbered patent requiring correction as follows:

Column 2, line 2, for "(4-pyridyl-thiophene" read *(4-pyridyl)-thiophene*; column 3, line 38, for the word "produce" read *product*; lines 41 to 44 inclusive, for that portion of the formula reading

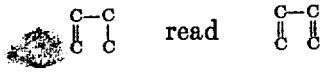

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*